United States Patent

Alexandre

[11] 4,040,442
[45] Aug. 9, 1977

[54] VALVE SEAT CONSTRUCTION FOR VALVES FOR CONTROLLING THE PRESSURE OF LIQUIDS

[75] Inventor: Philippe Alexandre, La Tronche, France

[73] Assignee: Societe Generale de Constructions Electriques et Mecaniques Alsthom, Paris Cedex, France

[21] Appl. No.: 636,143

[22] Filed: Nov. 28, 1975

[30] Foreign Application Priority Data

Dec. 19, 1974 France .............................. 74.42072

[51] Int. Cl.² ............................................ F16K 15/02
[52] U.S. Cl. ............................... 137/543.17; 251/361; 251/363

[58] Field of Search .................. 137/543.17, 540, 535; 251/363, 361

[56] References Cited

U.S. PATENT DOCUMENTS

| 2,731,036 | 1/1956 | Hughes ........................... 251/363 X |
| 2,854,021 | 9/1958 | Baldwin, Jr. et al. ........... 251/361 X |
| 3,361,154 | 1/1968 | Alexandre .................. 137/543.17 X |
| 3,506,242 | 4/1970 | Aunspach ........................... 251/361 |

Primary Examiner—William R. Cline

[57] ABSTRACT

Improvements in the seats of valves for controlling the pressure of liquids, consisting in arranging the seat of the shutter of the valve in a sliding configuration in a recess of the valve body and maintaining the seat in a normal position by its bearing on a shoulder of the recess under the effect of the pressure in the pipe.

4 Claims, 2 Drawing Figures

VALVE SEAT CONSTRUCTION FOR VALVES FOR CONTROLLING THE PRESSURE OF LIQUIDS

FIELD OF THE INVENTION

The invention relates to the construction of a seat for a valve for controlling the pressure of liquids.

BACKGROUND

In the use of valves for controlling the pressure in hydraulic pipes, under certain conditions, when the valve discharges, resonance phenomena occur between the flow in the pipe and the moving part of the valve, causing that part to vibrate.

That circumstance does not affect the safety of the pipe but, by the shock effect of the shutter on its seat, the quality of the fluid-tight sealing can deteriorate, inasmuch as the seat is blocked rigidly in the body, which is itself fixed on the pipe and since the seat has no possibility of retracting.

SUMMARY OF THE INVENTION

In order to avoid the risk of deterioration of the fluid-tight sealing, the present invention consists in arranging, with a suitable seal ring, the seat of the valve in a sliding configuration in a recess of the body and in maintaining the said seat in a normal position by bearing thereof on a shoulder of the recess, under the effect of the pressure in the pipe to which a surface having a suitable cross-section on that seat is subjected.

In these conditions, if the shutter of the valve starts to vibrate, when the latter discharges, if it strikes the seats, the latter, which is not fixed rigidly in its recess but is only under the effect of the pressure in the pipe, gives way under the shutter so that the deterioration of the fluid-tight sealing under the shock effect does not occurs.

BRIEF DESCRIPTION OF THE DRAWING

The characteristics and advantages of the invention will, moreover, become apparent from the following description of an embodiment given by way of an example, with reference to the accompanying drawings in which.

DETAILED DESCRIPTION

Figure 1:
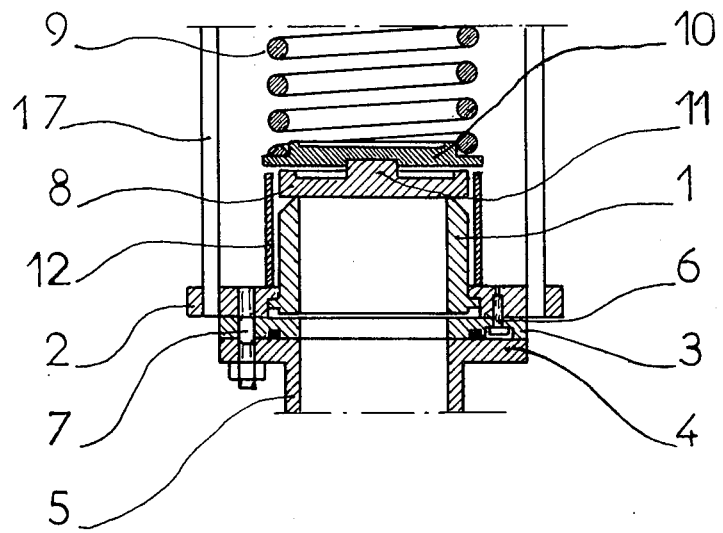
FIG. 1 is a cross-sectional view of a valve provided with the improvements according to the invention.

With reference to FIG. 1, therein is seen a ring 1 whose top rim constitutes the seat of the valve. The base of ring 1 slides in a recess of a body 2 whose bottom is constituted by an intermediate part 3, which bears on the end flange 4 of the pipe 5 on which the valve is fixed.

The intermediate part 3 is fixed to the body 2 by means of recessed cap screws 6 and the assembly formed by the two parts 2 and 3 is fixed to the end flange 4 of the pipe by means of bolts 7.

A shutter plate 8 is maintained against the ridge of the ring 1 by an operating spring 9 of the valve, through the intermediary of a cup-shaded part 10 the part 10 exerts its pressure action on the shutter plate 8 through a central boss 11 on the plate, which is engaged in a corresponding recess in part 10.

The bearing part 10 for the spring thus constitutes a shield, with respect to the shutter plate, against all unavoidable deformations of the end turn of the operation spring. The maintaining in position of the operation 9 is ensured by a stop plate, not shown, fixed by means of tierods 17.

A collar 12 made of two or more parts, which can be put in place around the ring and the shutter plate, without clamping, enables the removal of the ring and of the shutter plate 8 without modifying the adjustment of the spring 9, as the bearing part 10 of the spring will then bear on the collar.

Figure 2:
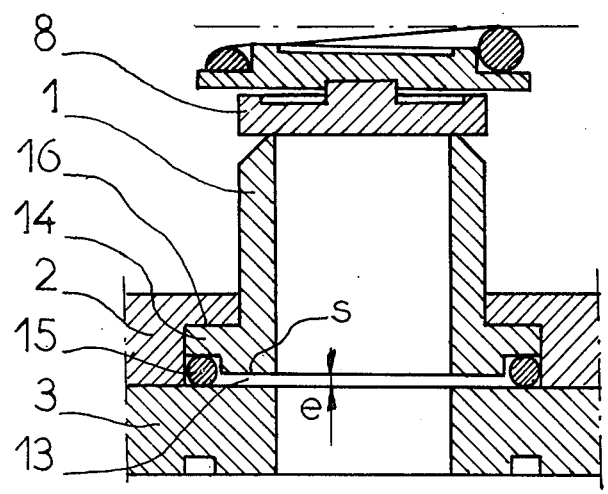
FIG. 2 is a partial view of FIG. 1, showing the seat of the valve in its recess.

FIG. 2 shows, on an enlarged scale, a recess 13 in the body 2 in which the base 14 of the ring 1 can slide, with interposition of a seal ring 15, so as to form a space (e) in the recess.

The base 14 of the ring 1 is maintained against the top wall 16 of the recess by a vertical upward force to which that ring 1 is subjected, caused by the pressure (p) of the pipe applied to the annular surface (s) of the base 14 of the ring 1, so that there remains the space (e) filled with liquid at the pressure of the pipe between the part 3 integral with the pipe and the ring 1.

In these conditions, if the shutter 8 starts vibrating subsequent to resonances between the flow in the pipe and the flow at the output of the valve when the latter discharges, the ring 1 moves downwards into the space (e), so that the shock loses its suddenness and the fluid-tight sealing between the shutter and its seat does not suffer any deterioration.

I claim:

1. An improvement in a valve for controlling the pressure of a liquid in a pipe, the valve having a seat and a shutter bearing, in closed position of the valve, on the seat, the improvement comprising a valve body connected to the pipe and having a recess slidably accommodating the seat, a seal member in said recess between the seat and the pipe, said valve body having a shoulder bounding said recess, the seat being urged against said shoulder, in a normal position, by the pressure of the liquid in the pipe such that a clearance space is formed in said recess between the seat and the pipe to permit slidable movement of the seat in said valve body under the effect of vibration of the shutter.

2. The improvement as claimed in claim 1 wherein said seal member is a ring.

3. The improvement as claimed in claim 2 comprising an intermediate part secured between said pipe and said valve body.

4. The improvement as claimed in claim 2 comprising resilient means urging said shutter against said seat.

* * * * *